United States Patent [19]

Ashinuma

[11] Patent Number: 5,410,527
[45] Date of Patent: Apr. 25, 1995

[54] INFORMATION RECORDING/REPRODUCING APPARATUS INCLUDING SETTING OPTIMUM RECORDING CONDITION OR REPRODUCING CONDITION

[75] Inventor: Takaaki Ashinuma, Yokohama, Japan

[73] Assignee: Canon Kabushiki Kaisha, Tokyo, Japan

[21] Appl. No.: 920,534

[22] Filed: Jul. 28, 1992

Related U.S. Application Data

[63] Continuation of Ser. No. 449,386, Dec. 7, 1989, abandoned, which is a continuation of Ser. No. 256,117, Oct. 11, 1988, abandoned, which is a continuation of Ser. No. 861,341, May 9, 1986, abandoned.

[30] Foreign Application Priority Data

| May 14, 1985 | [JP] | Japan | 60-102441 |
| May 14, 1985 | [JP] | Japan | 60-102442 |
| Jun. 20, 1985 | [JP] | Japan | 60-134832 |

[51] Int. Cl.⁶ .............................. G11B 7/00
[52] U.S. Cl. ..................... 369/50; 369/13; 369/54; 369/58; 369/116
[58] Field of Search .............. 369/32, 48, 49, 54, 369/58, 275, 275.1–275.5, 13, 50, 116; 360/25, 28, 69

[56] References Cited

U.S. PATENT DOCUMENTS

| 3,536,858 | 10/1970 | Limbaugh et al. | 369/49 |
| 3,848,092 | 3/1974 | Shamma | 369/48 |
| 4,038,692 | 7/1977 | Umeda et al. | 360/25 |
| 4,093,961 | 6/1978 | Kanamaru | 369/58 X |
| 4,494,226 | 1/1985 | Hazel et al. | 369/58 X |
| 4,583,134 | 4/1986 | Nakamichi | 360/69 |
| 4,609,949 | 9/1986 | Kutaragi | 360/28 |
| 4,611,314 | 9/1986 | Ogata et al. | 369/48 X |

FOREIGN PATENT DOCUMENTS

| 58-105408 | 6/1983 | Japan | 369/54 |
| 58-161160 | 9/1983 | Japan | 369/54 |
| 58-212969 | 12/1983 | Japan | 369/54 |
| 59-42653 | 3/1984 | Japan | 369/275 |
| 59-60742 | 4/1984 | Japan | 369/54 |
| 59-81671 | 5/1984 | Japan | 369/54 |
| 60-83234 | 5/1985 | Japan | 360/97 |
| 60-113361 | 6/1985 | Japan | 369/58 |
| 8404417 | 11/1984 | WIPO | 369/59 |

OTHER PUBLICATIONS

English Translation of JP 59-60742.

Primary Examiner—W. R. Young
Attorney, Agent, or Firm—Fitzpatrick, Cella, Harper & Scinto

[57] ABSTRACT

An information recording and reproducing apparatus includes: a recording device to record information to a recording medium such as a magnetooptic disc, optical disc, or the like; a reproducing device to reproduce the information recorded to this medium; and a controller to control the recording and reproducing devices on the basis of optimum recording and reproducing conditions for the recording medium which have preliminarily been recorded in a predetermined area of the medium. The recording device includes a laser beam generator or magnetic field generator. The reproducing device includes a laser beam generator. The controller controls a strength of the laser beam or magnetic field. With this apparatus, the recording and reproducing operations for the recording medium can always be performed in an optimum state, so that the reliability of the reproduced data is improved.

51 Claims, 8 Drawing Sheets

INFORMATION RECORDING/REPRODUCING APPARATUS INCLUDING SETTING OPTIMUM RECORDING CONDITION OR REPRODUCING CONDITION

This application is a continuation of application Ser. No. 07/449,386 filed Dec. 7, 1989, now abandoned, which application is a continuation of application Ser. No. 07/256,117 filed Oct. 11, 1988, now abandoned, which application is a continuation of application Ser. No. 06/861,341, filed May 9, 1986, now abandoned.

BACKGROUND OF THE INVENTION

1. Field of the Invention

The present invention relates to a control of at least one of the recording and reproducing conditions in an apparatus for recording and reproducing information. The information recording and reproducing apparatus in the invention relates to an apparatus which performs either the recording or the reproduction of information or performs both the recording and reproduction of information.

2. Related Background Art

In the case of optically recording and reproducing information, there has been known a photo-electromagnetic recording system in which a rare earth-transition metal amorphous system is used as a material of a recording medium, a laser beam is irradiated onto the recording medium upon recording, the surface of the recording medium is heated to a temperature near the Curie point, flux reversal is caused to form pits by applying an auxiliary magnetic field, and upon reproduction, information is reproduced by use of the well-known Kerr effect or Faraday effect.

This recording system presents the problem that when the record laser power and auxiliary bias magnetic field strength are constant, the sizes of pits which are recorded and the like are influenced due to differences of the static characteristics of the recording material, such as the coercive force Curie temperature, sensitivity, and the like of the recording medium. In the case of reproducing a signal in this state, a distortion occurs in the regenerated waveform, so that there is an occurrence of errors in the reproduced information.

To eliminate such an adverse influence, there is considered a system in which, in order to examine the characteristics of the disc, the recording and reproducing operations are repeated several times each time the disc is repeatedly used, thereby obtaining an optimum value. However, in the case of the optical disc of the DRAW (Direct Read After Write) type, the data which has once been recorded cannot be erased, so that there is a limitation in the automatic control of the record power or the like, since the record area and the number of recording times are limited.

On the other hand, in the case of an erasable magnetooptic disc and the like, if the automatic setting operation is performed each time the disc is mounted, it takes an additional time until the apparatus actually records and reproduces the data. Further, an additional apparatus for the automatic setting operation is needed, resulting in an increase in cost of the apparatus.

On the contrary, when using each disc without executing any adjustment, the ranges of the variations in recording sensitivity, coercive force, and the like of the disc must be set to small values. In turn, the productivity of the discs is also adversely influenced and the cost rises.

SUMMARY OF THE INVENTION

It is an object of the present invention to eliminate the foregoing drawbacks.

Another object of the invention is to improve an information recording apparatus.

Still another object of the invention is to improve an information reproducing apparatus.

Still another object of the invention is to provide an optical recording medium in which the recording condition for the recording medium is recorded to the recording medium, thereby enabling recording to always be carried out in an optimum state.

Still another object of the invention is to provide an optical information recording apparatus in which the recording condition for the recording medium is recorded to the recording medium and this recording condition is read out of the recording medium and the recording means is controlled, thereby enabling the reliability of the recording data to be raised.

Still another object of the invention is to provide an information recording apparatus which can promptly set the optimum recording condition for various kinds of recording media.

Still another object of the invention is to provide an optical recording medium in which the reproducing condition for the recording medium is recorded to the recording medium, thereby enabling reproduction to always be carried out in an optimum state.

Still another object of the invention is to provide an optical information reproducing apparatus in which the reproducing condition for the recording medium is recorded to the recording medium and this reproducing condition is read out of the recording medium and the reproducing means is controlled, thereby enabling the reliability of the reproduced data to be raised.

Still another object of the invention is to provide an information reproducing apparatus which can promptly set the optimum reproducing condition for various recording media.

The above and other objects and features of the present invention will become apparent from the following detailed description and the appended claims with reference to the accompanying drawings.

DETAILED DESCRIPTION OF PREFERRED EMBODIMENTS

An embodiment of the present invention will now be described hereinbelow with reference to the drawings.

Figure 1A:
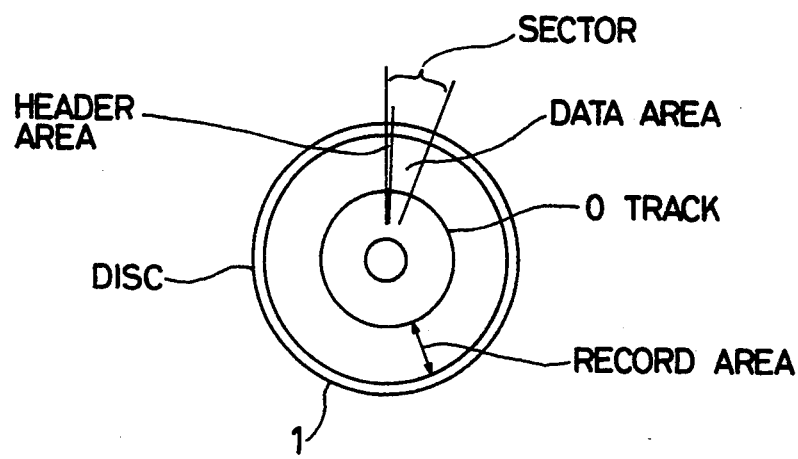
FIG. 1A is an external view of a disc to which the present invention can be applied.
Figure 1B:
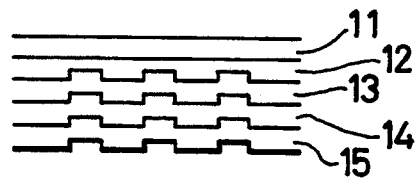
FIG. 1B is a diagram showing a structure of layers of the disc.

FIG. 1A is a diagram showing a magnetooptic recording medium. This medium has a structure of layers as shown in FIG. 1B. Reference numeral 11 denotes a base plate which is generally made of glass, PMMA (Polymethyl Methacrylate), PC (Polycarbonate), or the like; reference numeral 12 is a photopolymer layer in which tracking guide grooves are formed; reference numeral 13 is a layer consisting of a dielectric material such as SiO, ZnS, $Si_3N_4$, or the like; reference numeral 14 is a recording layer which is made of rare earth— transition amorphous alloy; and reference numeral 15 is a protection layer consisting of a material similar to the layer 13. Tracks are spirally or coaxially formed and each track is divided into n sectors. The sector number, track number, clock sync bit, address mark, sector mark, and the like corresponding to each sector are preliminarily preformated in the header area of each sector.

Figure 2:
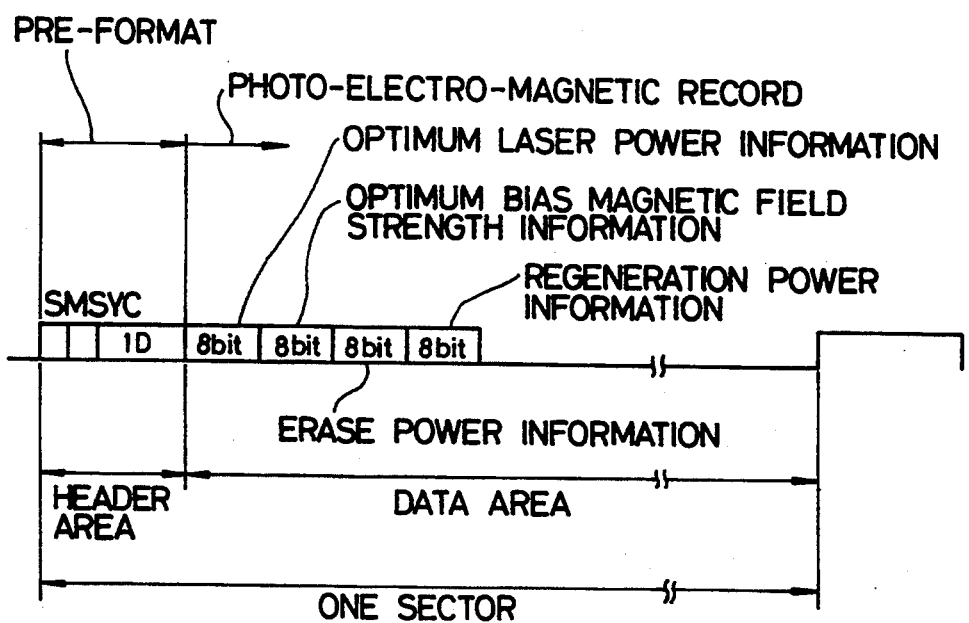
FIG. 2 is a diagram showing a form of specific sectors of the disc.

The track numbers are set from the inner track in accordance with the sequence of 0 track, 1 track, . . . The 0 track of the innermost rim is used as the area to record the management information of the disc and is distinguished from other areas to record ordinary data. One specific sector in the 0 track is used as a recording area indicating the recording conditions of a laser beam for the recording medium, such as optimum record laser power information, optimum bias magnetic field strength information, optimum eraser power information, and optimum regeneration power information. Each of this information is data of eight bits and recorded four bytes from the head of the data area of the sector by use of a magnetooptic (i.e., photo-electromagnetic) effect as shown in FIG. 2.

Figure 3:
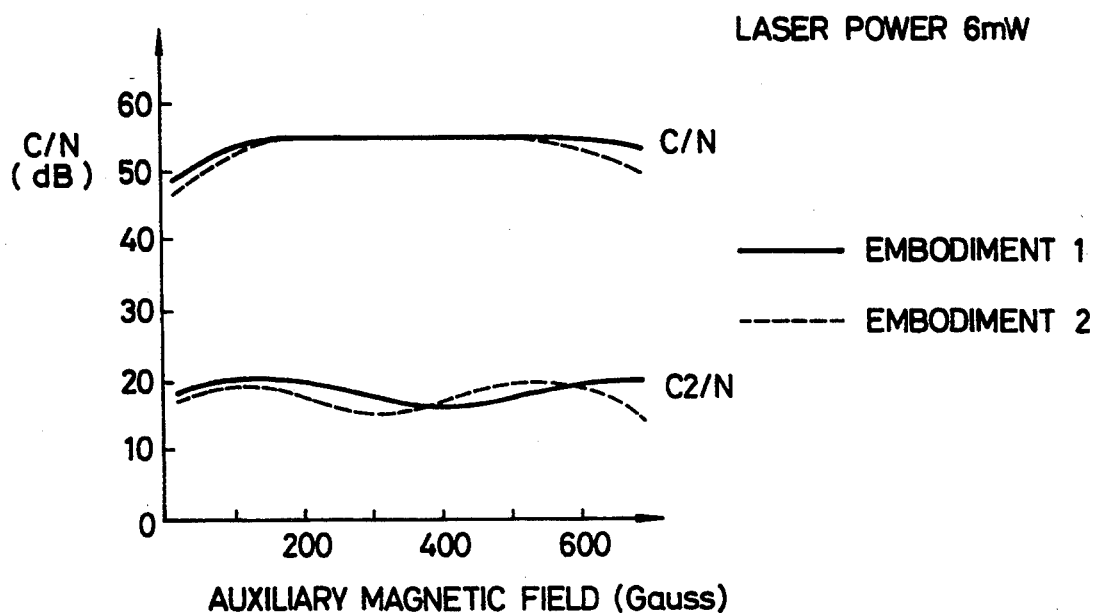
FIGS. 3 and 4 are diagrams showing the relation between the auxiliary magnetic field and the C/N ratio.
Figure 4:
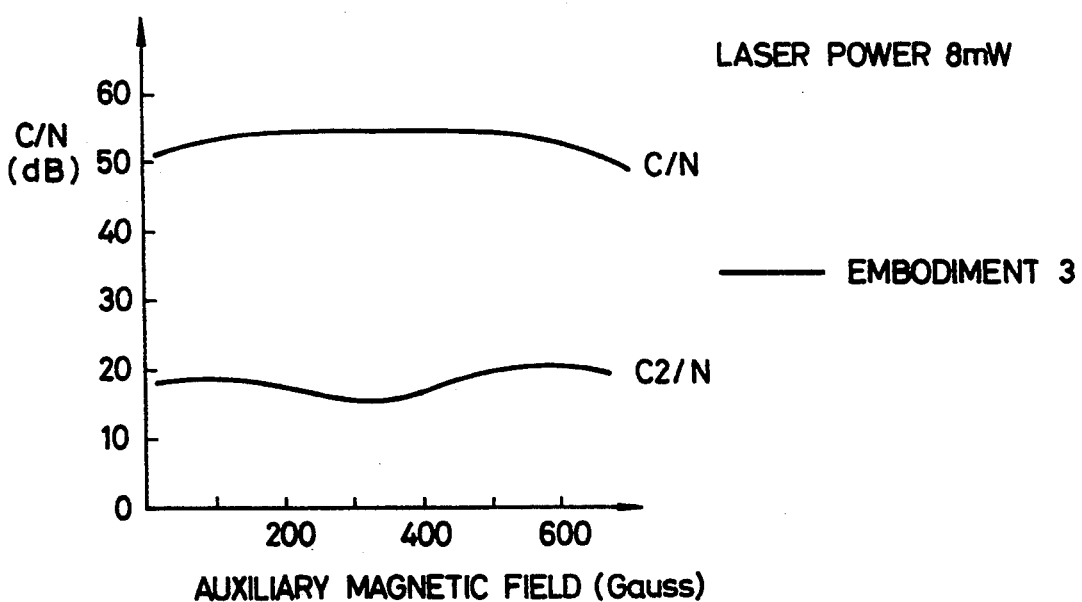

As examples of this information, the recording medium of ternary amorphous alloy BdTbFe having a Curie temperature of 150° C. and a coercive force of 3.0 kOe was used and the C/N ratio was measured under conditions such that a rotating speed of the disc was 1800 rpm, a laser power was 6 mW, a carrier (recording) frequency was 2 MHz, and a band width was 30 KHz. The relation among the bias magnetic field and the C/N ratio and the C2/N ratio indicative of the C/N ratio of secondary harmonics is shown in FIG. 3. In the case of using the medium of CdTbFe having a Curie temperature of 150° C. and a coercive force of 2.5 kOe, the relation as shown by broken lines in FIG. 3 was obtained. On the other hand, in the case of using the medium of GdTZBFeCo having a Courier temperature of 220° C. and a coercive force of 2.5 kOe, and when a laser power was set to 8 mW, the result as shown in FIG. 4 was obtained.

It will be understood from those graphs that in the case of the first medium, the optimum recording condition is such that the record laser power is 6 mW and the auxiliary bias magnetic field is 400 Gauss.

In the case of the second medium, the optimum recording condition is such that the laser power is 6 mW and the auxiliary bias magnetic field is 300 Gauss.

In the case of the third medium, the optimum recording condition is such that the record laser power is 8 mW and the auxiliary bias magnetic field is 350 Gauss.

On the other hand, the erase power is generally set to be slightly higher than the record power. The regeneration power is set to a value which is fairly lower than the record power, namely, about 1/5 of the record power in a manner such that even if data of the same track is repeatedly reproduced many times, the pits maintain a stable state and the reproduced signal level is not extremely reduced.

Those recording and reproducing conditions are preliminarily measured when discs are manufactured and recorded as each data onto the disc.

Figure 5:
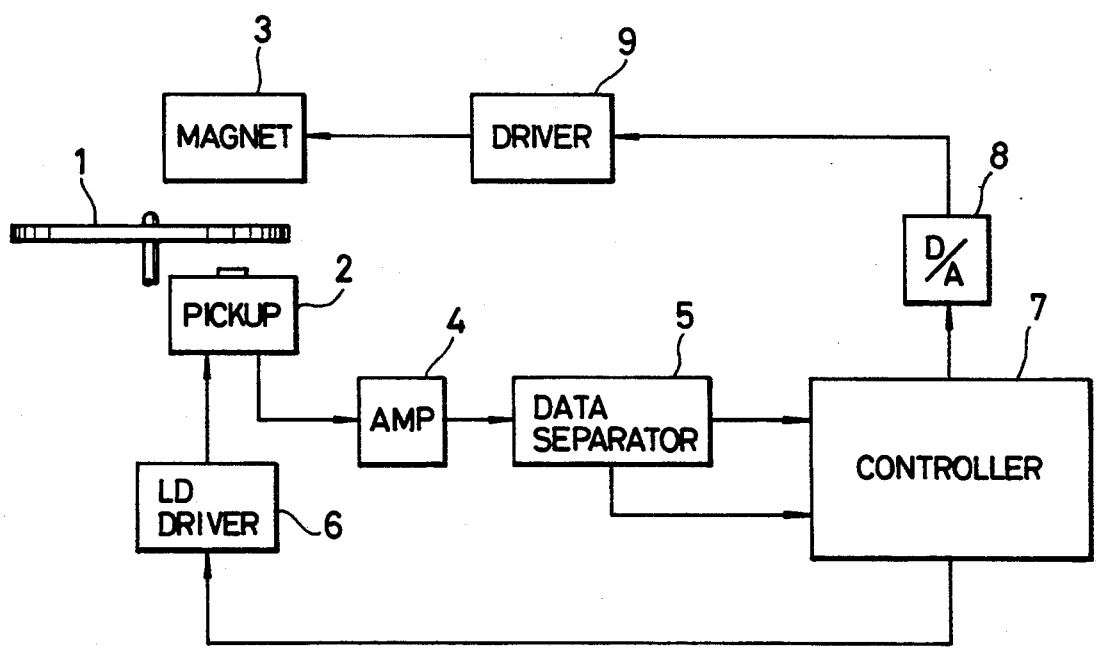
FIG. 5 is a block diagram of an information recording and reproducing apparatus to which the invention can be applied.
Figure 6:
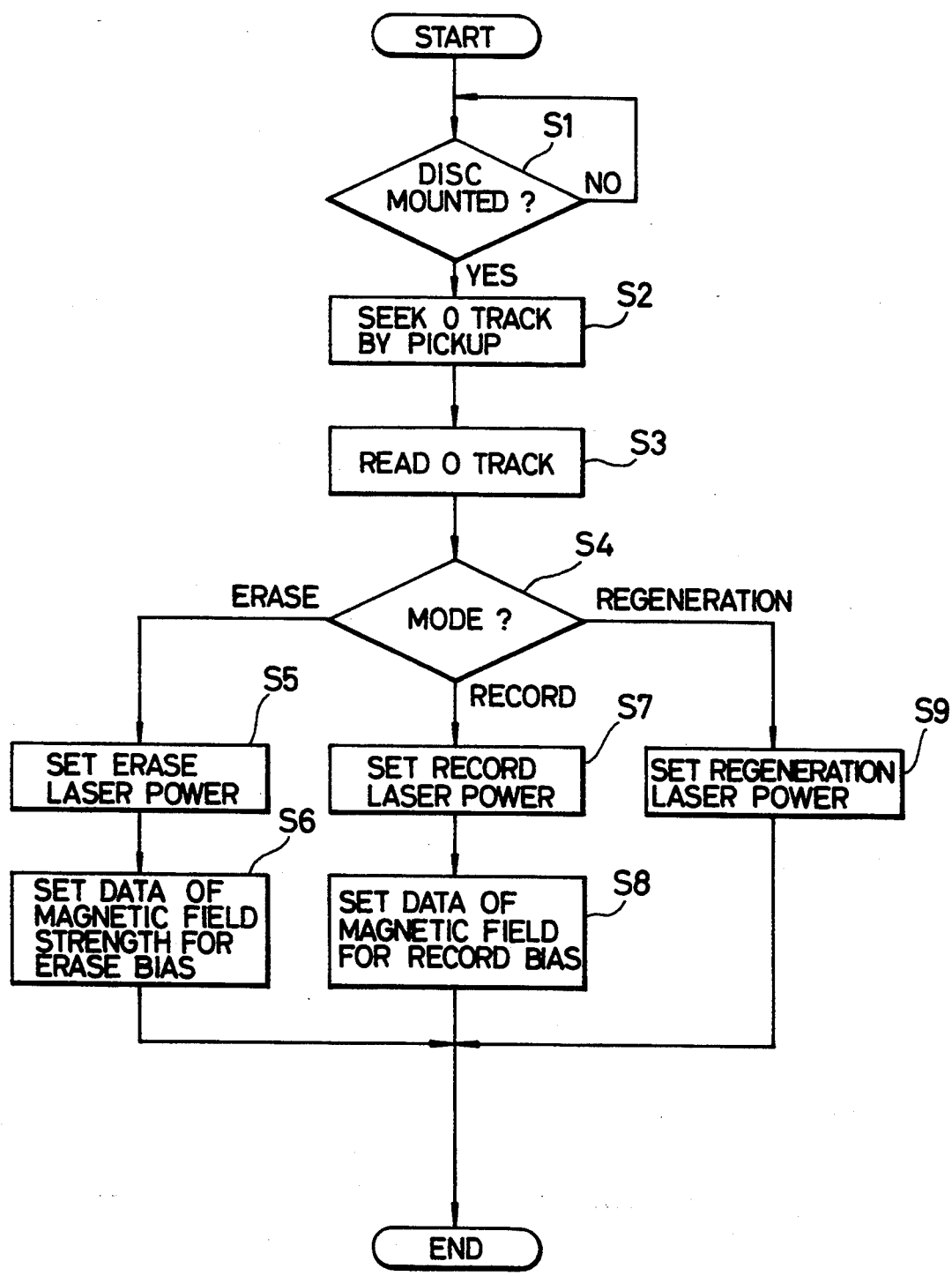
FIG. 6 is a flowchart showing the operation of the apparatus shown in FIG. 5.

FIG. 5 shows a block diagram of an information recording and reproducing apparatus using the foregoing optical information recording medium. FIG. 6 shows a flowchart for the operation of this apparatus. The operation will then be described with reference to these diagrams.

Referring now to FIG. 5, reference numeral 1 denotes a magnetooptic disc onto which the optimum recording condition and other data are recorded; reference numeral 2 is an optical pickup to record and reproduce information onto and from the recording medium 1; reference numeral 3 is an electromagnet to apply an auxiliary bias magnetic field to the recording medium upon recording; reference numeral 4 is an amplifier to amplify the information signal read out by the optical pickup 2 to a level which is needed at the post stage; reference numeral 5 is a data separator to reproduce the original information and other necessary clocks from the reproduced information signal and thereby obtain the demodulated signal; reference numeral 6 is a laser driver to drive a semiconductor laser provided in the optical pickup 2; reference numeral 7 is a controller to control the operations of those components, respectively; and reference numeral 8 is a D/A (digital-to-analog) converter to convert a digital signal from the controller 7 to an analog value in order to drive a driver 9 for allowing a bias magnetic field to be generated from the electromagnet 3.

First, when it is detected that the disc 1 has been mounted to the information recording and reproducing apparatus by optical means such as a photo interrupter or the like (step 1), the pickup 2 is moved to the innermost rim of the disc by an optical head advance mechanism (not shown) and the 0 track is sought by a search mechanism (not shown) to detect a desired track (step 2). Then, the information in the index area is reproduced by reading the 0 track (step 3), In this case, the regeneration laser beam power is set to the necessary minimum value, The reproduced information is amplified and demodulated and thereafter it is supplied to the controller 7, The controller 7 determines which one of the recording, reproducing, and erasing modes has been instructed (step 4). The controller 7 outputs the optimum values of the regeneration laser beam power, record laser beam power, erase laser beam power, bias magnetic field strength, and the like in each operating mode determined by the laser driver 6 and D/A converter 8 for generating the magnetic field on the basis of the respective information read. In this manner, the controller 7 controls a current which is applied to the semiconductor laser to obtain a desired laser power. After the D/A converter 8 converts the bias magnetic field strength data to the analog value, it controls a current of the driver 9 for generating the bias magnetic field, thereby allowing the optimum bias magnetic field to be generated from the electromagnet 3 (steps 5 to 9).

The data recorded onto the disc is not limited to the above-mentioned data but a gain of the amplifier, a threshold value of a binarizing circuit, and the like, which will be explained hereinafter, are also recorded.

Although the case when recording and reproducing conditions are preliminarily recorded onto the disc has been described in the above embodiment, the invention can be also applied to the case of using the disc to which recording and reproducing conditions are not recorded. Another embodiment using such a disc will then be described hereinbelow.

Figure 7:
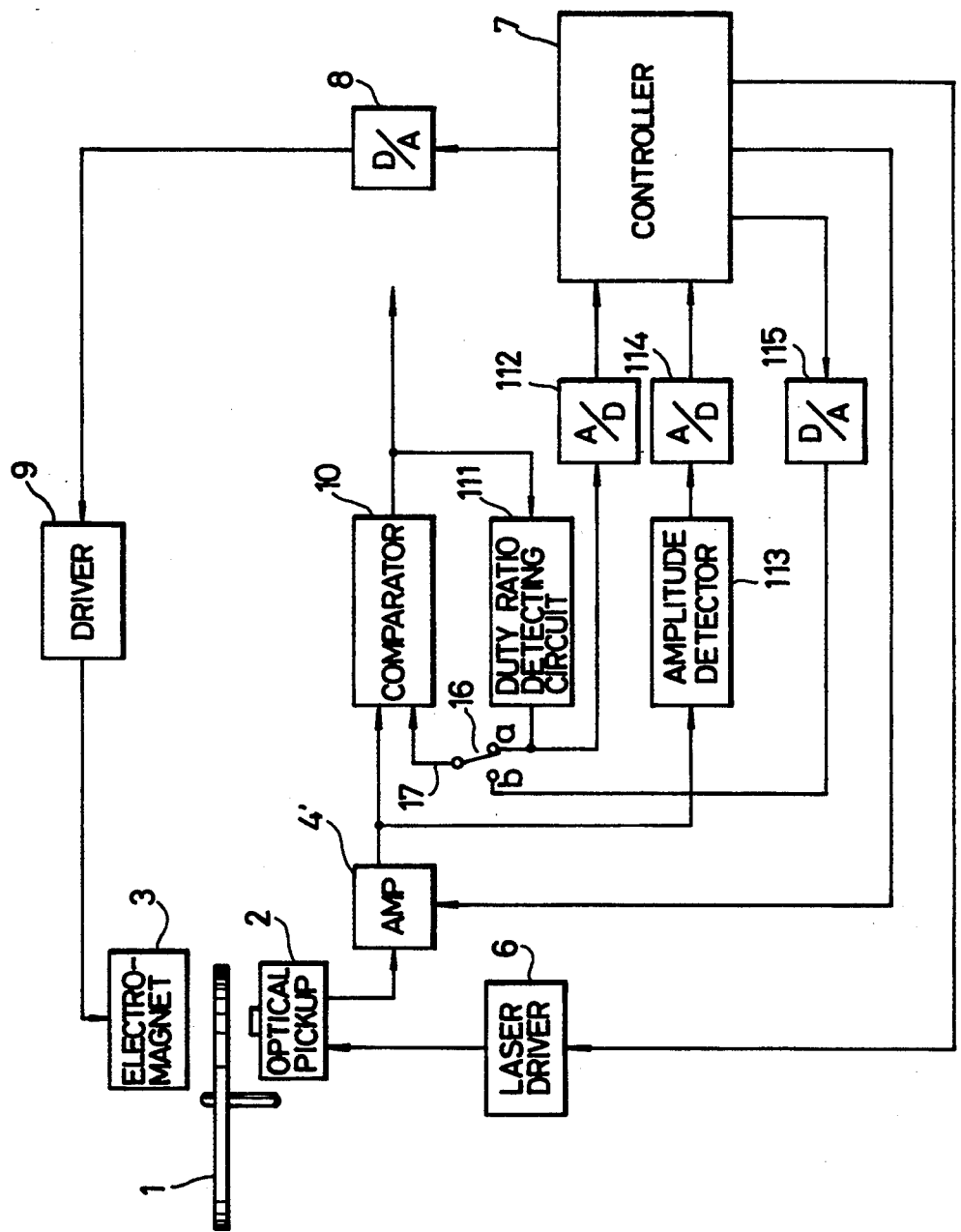
FIG. 7 is a block diagram showing an arrangement of another embodiment of an information recording and reproducing apparatus.

FIG. 7 is a block diagram of an information recording and reproducing apparatus showing another embodiment, in which parts and components similar to those shown in FIG. 5 are designated by like reference numerals and their descriptions are omitted here.

In FIG. 7, reference numeral 4' denotes a variable gain amplifier to amplify the information signal reproduced by the optical pickup 2 to a necessary level; reference numeral 10 is a level comparator to convert the reproduced information signal amplified by the amplifier 4' to two binarized signals of "0" and "1"; reference numeral 111 is a duty ratio detecting circuit to detect duty ratios of the binarized signals; reference numeral 112 is a first A/D (analog-to-digital) converter to convert the duty ratios detected by the detecting circuit 111 to the digital data; reference numeral 113 is an amplitude detector to rectify the output of the amplifier 4' and detect an amplitude of the reproduced output; reference numeral 114 is a second A/D converter to convert analog data from the amplitude detector 113 to digital data; reference numeral 115 is a D/A converter to convert a threshold level of the comparator 10 to an analog value; and reference numeral 16 is a switch to select a slice level.

Figure 8A:
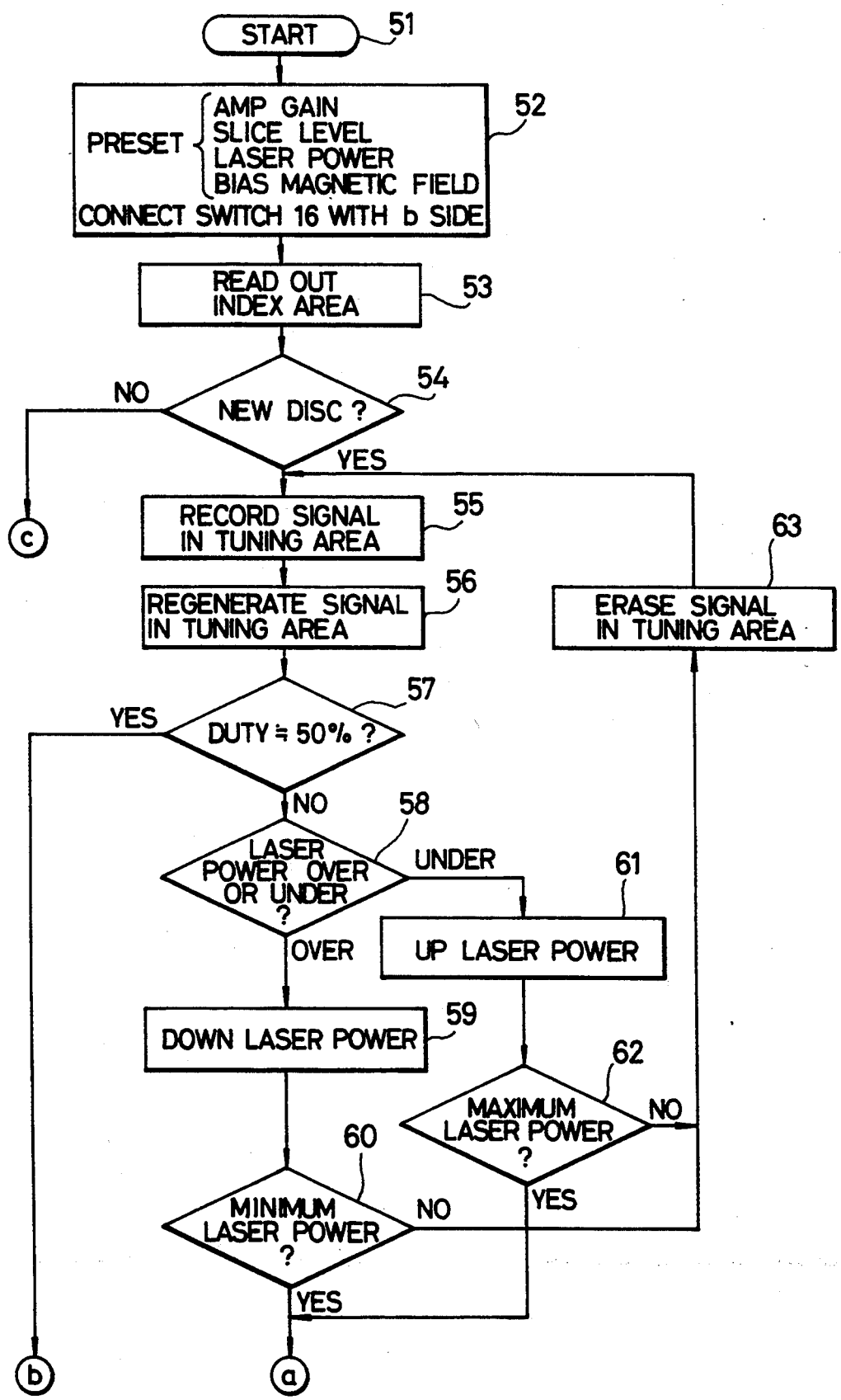
FIGS. 8A to 8C are flowcharts showing the operation of a controller.
Figure 8B:
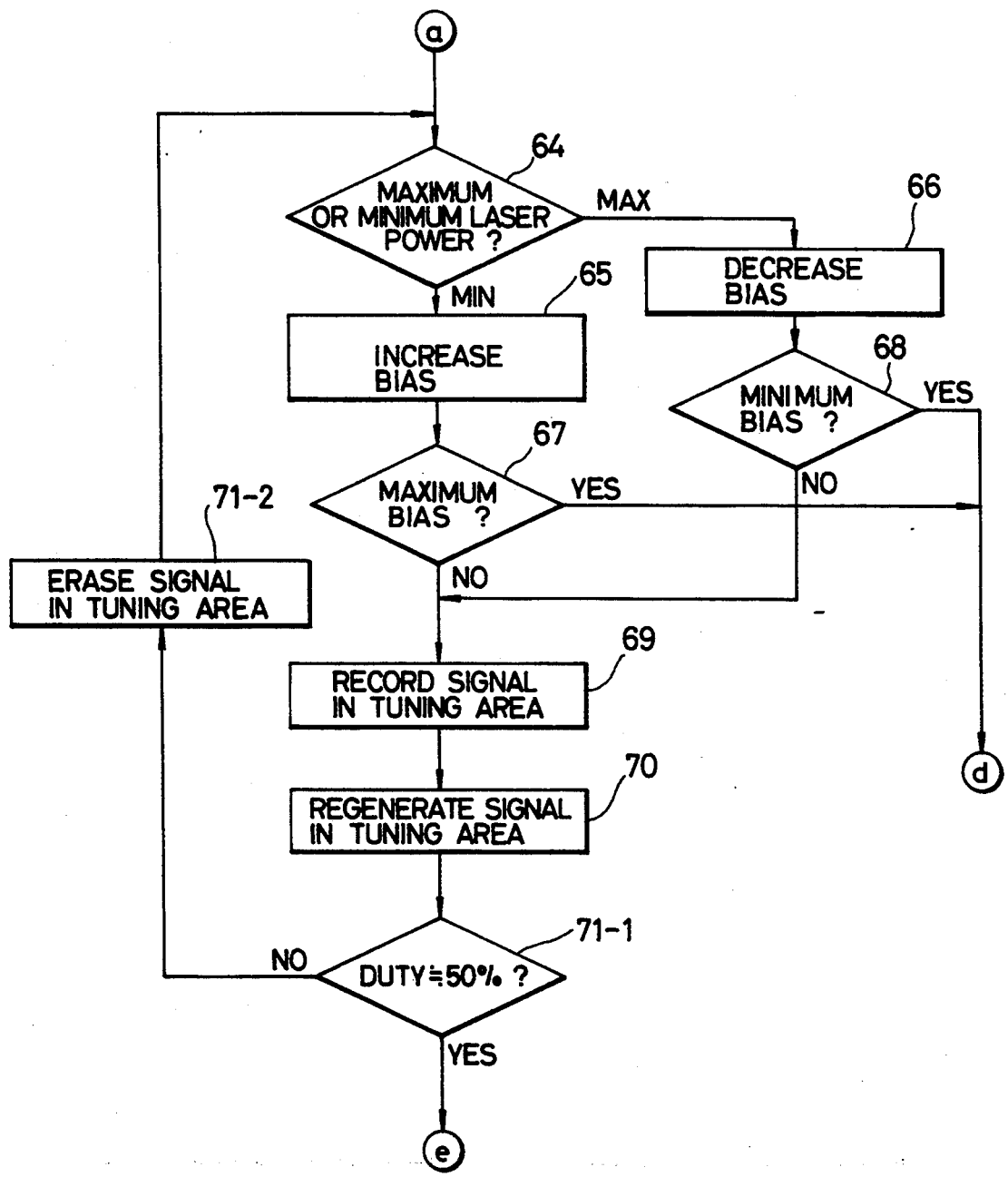
Figure 8C:
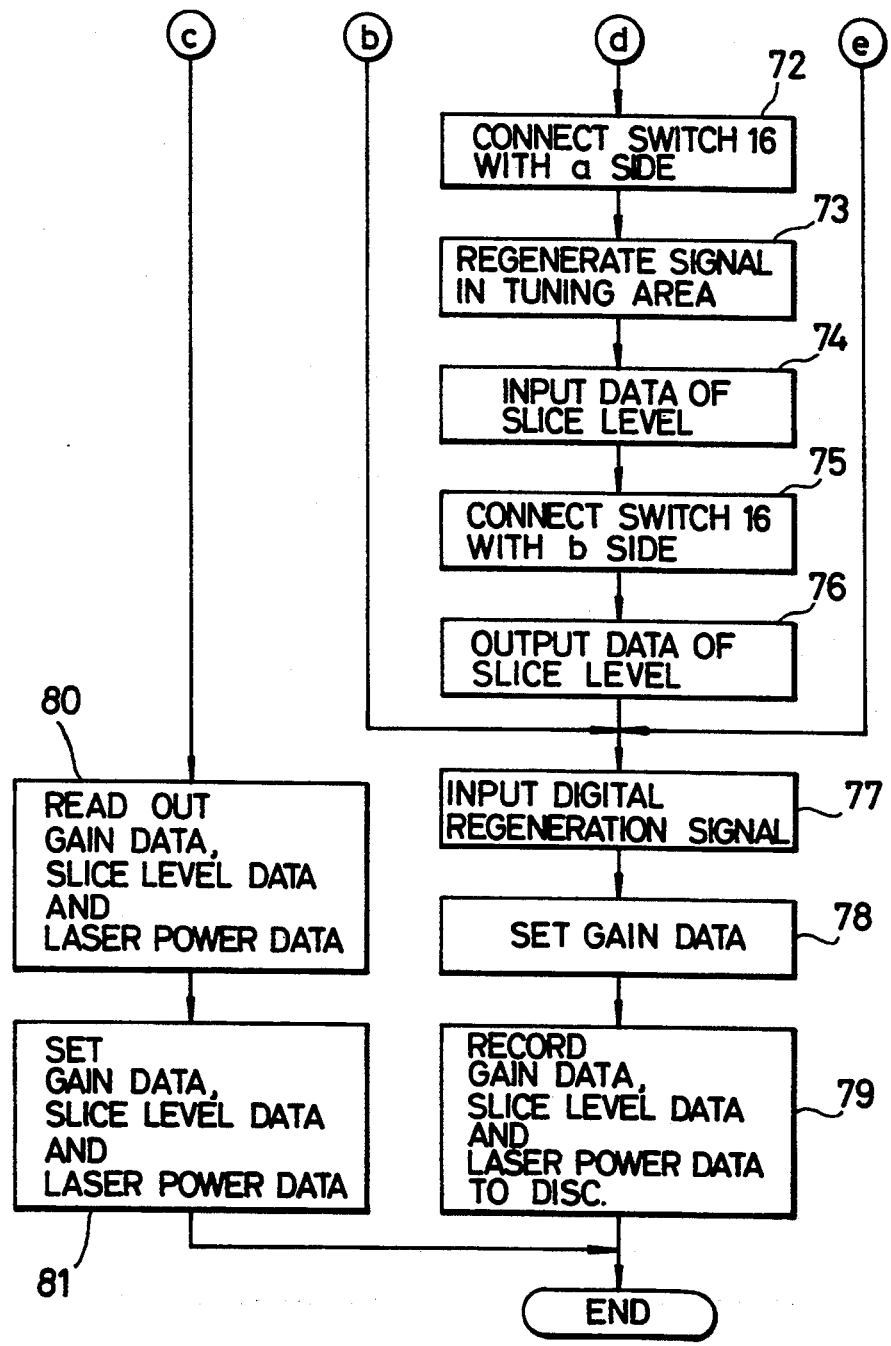

The operation of this apparatus will then be explained with reference to FIG. 7. Since the recording and reproducing processes are executed in a well-known manner, their descriptions are omitted in this specification. FIGS. 8A to 8C show flowcharts for the operations of this apparatus in this embodiment and the operation will be described with reference to these diagrams.

First, when it is detected that the disc has been mounted on a turntable (not shown), a gain of the amplifier 4' is set to a reproduction level of an average disc, a slice level for binarization is set to a value in the case when an ideal signal was reproduced, and a peak power of a laser beam and a bias magnetic field in the writing mode are also preliminarily set to values of an average disc as shown in step 52. The selecting switch 16 of the slice level is connected to the side b. An index area is preset to the innermost rim (or outermost rim) of the disc 1. In the index area, the data area corresponding to the reproduced signal level, data area corresponding to the bias magnetic field, data area corresponding to the slice level, data area corresponding to the record peak laser power, and the like are respectively set. In addition, an area into which the information indicating whether the disc has already been used once or not, namely, whether the recording and reproducing conditions have been recorded or not recorded is also set. In steps 53 and 54, the data is read out of the index area and inputted to the information recording and reproducing apparatus (hereinafter, referred to as a disc drive) and a check is made to see if the disc is a new disc or a disc which has already been used once. Namely, a check is made to see if each data corresponding to the slice level, laser power, bias strength, and regeneration level has already been written into the index area or not. If the disc is a new disc, a signal of a constant frequency of a duty ratio of 50% is recorded into a predetermined area (hereinafter, referred to as a tuning area) on the disc (step 55). In steps 56 and 57, the signal recorded in the tuning area is reproduced and a duty cycle of the reproduced signal is measured. In FIG. 7, a threshold level 17 of the binarizing circuit is set to a level which becomes a duty ratio of 50% when an ideal signal is preliminarily inputted. Therefore, the signal corresponding to the duty ratio of the reproduced signal is obtained as an output of the duty ratio detecting circuit 111. This analog signal is converted to the digital signal by the A/D converter 112 and sent to the controller 7.

If the controller determines that the duty ratio is not 50%, a check is made to see if the record power is over or under on the basis of the duty ratio (step 58). When the duty ratio is smaller than 50%, namely, when the laser power is smaller, the laser power is increased by a predetermined amount. When the duty ratio is larger than 50%, namely, when the laser power is too large, the laser power is reduced by a predetermined amount. In this case, a check is made to see if the laser power has reached the limit range which can be controlled or not. If NO, the signal recorded in the tuning area is erased and similar processes are again repeated by a new laser power (steps 59 and 63).

If the laser power has reached the controllable limit range, the controller 7 first discriminates whether the laser power is the maximum value or the minimum value. In the case of the maximum laser power, the driver 9 is controlled to reduce the record bias magnetic field by a predetermined amount. In the case of the minimum laser power, the record bias magnetic field is increased (steps 64 to 66). If the bias magnetic field lies within the controllable range, the bias magnetic field is changed by a constant amount at a time and the recording and reproduction are executed within the tuning area until the duty ratio becomes 50% or the bias becomes a controllable limit range (steps 64 to 71-2). If both the laser power and the record bias magnetic field become controllable limit ranges, the limit values of the laser power and record bias magnetic field are written into the tuning area. Next, the switch 16 is connected to the side a (step 72) and the signal is reproduced (step 73). At this time, the output of the duty ratio detecting circuit 111 is fed back and becomes the threshold value of the binarizing circuit 10. The duty cycle detector functions as a kind of integrator and detects the DC component of the value of which the binary signal was integrated, thereby detecting the duty ratio from this value. By setting the output of the detecting circuit 111 so as to become the duty ratio of 50% when this closed loop is formed, even if the distorted signal is inputted as well, the threshold value changes so that the output of the duty ratio of 50% is automatically obtained (step 73). This threshold value is inputted to the controller 7 through the A/D converter 112 (step 74) and set as the slice level and the switch 16 is connected to the side b (step 75). The slice level data is converted to the analog value by the D/A converter 115 and added to the threshold value input of the binarizing circuit 10 (step 76).

After the duty ratio of the reproduced signal became 50%, the analog reproduced signal from the preamplifier is rectified and smoothed in the amplitude detector 113 and the amplitude of the reproduced signal is detected. This amplitude data is converted to the digital data by the A/D converter 114 and supplied to the controller 7 (step 77). The controller 7 sends the gain data to the variable gain amplifier 4' and keeps the reproduced signal level constant so that the amplitude of the reproduced signal becomes a predetermined amplitude on the basis of the amplitude data (step 78).

The above-mentioned four kinds of data regarding the record laser power, record bias magnetic field strength, slice level, and gain obtained in this manner are stored into a memory in the controller 7 upon completion of each detecting operation. When those four data are obtained, they are recorded in the respective areas of the index area on the disc (step 79).

On the contrary, in the case when it is detected that the disc has already been used once in the discriminating step 54, namely, when those four data have already been written, data in the index area of the disc is reproduced to read each data of laser power, bias magnetic field, slice level, and gain (step 80). Then, each value is set on the basis of the data read by the controller 7 (step 81) and thereafter the apparatus waits until the ordinary operating mode is instructed.

Those data are read out when the disc is used and the laser power, magnetic field strength, and the like are controlled on the basis of these data. On the other hand, the data which is measured is not limited to the foregoing data but, for example, the laser power upon reproduction is also measured in a manner similar to the above.

Although the magnetooptic disc has been described in the embodiments, the substantially similar operations can be executed with respect to the optical disc, as well, excluding that data about the bias magnetic field is not recorded.

In addition, the invention can be also applied to other recording medium, such as a card-like medium and the like, as well as the disc-like recording medium.

The present invention is not limited to the foregoing embodiments, but many modifications and variations are possible within the spirit and scope of the appended claims of the invention.

What is claimed is:

1. An information recording/reproducing apparatus for recording information on a recording medium under recording conditions which have been recorded by a method comprising the steps of measuring various characteristics of the recording medium, which affect recording conditions for recording of the information on the recording medium, determining a plurality of optimal recording conditions for the recording of the information on the recording medium, on the basis of the various characteristics of the recording medium measured in the measuring step, and recording the plurality of recording conditions determined in the determining step, on a predetermined area of the recording medium, said apparatus comprising:

recording means for recording information on the recording medium;

reproducing means for reproducing a plurality of recording condition signals representing the plurality of recording conditions previously recorded on the recording medium, wherein said plurality of recording condition signals includes a plurality of operation values of said recording means for effectively recording information on the recording medium; and control means for controlling an operation of said recording means in accordance with the plurality of operation values reproduced by said reproducing means before information is recorded on the recording medium by said recording means.

2. An information recording/reproducing apparatus according to claim 1, wherein said recording means comprises light beam generating means for generating a light beam, and wherein said control means comprises means for controlling the power of the light beam upon recording.

3. An information recording/reproducing apparatus according to claim 1, wherein said recording means comprises magnetic field generating means for generating a magnetic field, and wherein said control means comprises means for controlling the strength of the magnetic field.

4. An information recording/reproducing apparatus according to claim 1, wherein the recording medium includes a control track comprising an area on which management information for managing information to be recorded on the recording medium is recorded, the operation values being recorded on the control track, and wherein said reproducing means comprises means for reproducing an operation value of one of the recording conditions by scanning the control track.

5. An information recording/reproducing apparatus according to claim 1, wherein said recording means comprises means for optically recording information on the recording medium.

6. An information recording/reproducing apparatus according to claim 1, wherein said recording means comprises means for recording information on the recording medium by a photoelectromagnetic effect.

7. An information recording/reproducing apparatus according to claim 1, wherein said control means comprises means for controlling said recording means in accordance with an operation value represented by a predetermined number of bits.

8. An information recording/reproducing apparatus according to claim 1, wherein said recording means and said reproducing means comprise a common head.

9. An information reproducing apparatus for reproducing information recorded on a recording medium under recording conditions which have been recorded by a method comprising the steps of measuring various characteristics of the recording medium, which affect reproduction conditions for reproducing of the information from the recording medium, determining a plurality of optimal reproduction conditions for the reproduction of the information from the recording medium, on the basis of the various characteristics of the recording medium measured in the measuring step, and recording the plurality of reproduction conditions determined in the determining step, on a predetermined area of the recording medium, said apparatus comprising:

reproducing means for reproducing information recorded on the recording medium;

reading means for reading out a plurality of reproduction condition signals representing the plurality of reproduction conditions previously recorded on the recording medium, wherein said plurality of reproduction condition signals includes a plurality of operation values of said reproducing means for effectively reproducing information from the recording medium; and control means for controlling an operation of said reproducing means in accordance with the plurality of operation values read out by said reading means before reproducing information recorded on the recording medium by said reproducing means.

10. An information reproducing apparatus according to claim 9, wherein said reproducing means comprises light beam generating means for generating a light beam, and wherein said control means comprises means for controlling the power of the light beam upon reproduction.

11. An information reproducing apparatus according to claim 9, wherein said reproducing means comprises analog-to-digital converting means and wherein said control means comprises means for controlling a threshold value of said analog-to-digital converting means.

12. An information reproducing apparatus according to claim 9, wherein said reproducing means comprises amplifying means for amplifying a reproduced signal, and wherein said control means comprises means for controlling the gain of said amplifying means.

13. An information reproducing apparatus according to claim 9, wherein said reproducing means comprises means for optically reproducing information recorded on the recording medium.

14. An information reproducing apparatus according to claim 9, wherein said reproducing means comprises means for reproducing information recorded on the recording medium by the Kerr effect or the Faraday effect.

15. An information reproducing apparatus according to claim 9, wherein said control means comprises means for controlling said reproducing means in accordance with an operation value represented by a predetermined number of bits.

16. An information reproducing apparatus according to claim 9, wherein the recording medium includes a control track comprising an area on which management information for managing information recorded on the recording medium is recorded, the operation values being recorded on the control track, and wherein said reproducing means comprises means for reproducing an operation value of one of the reproduction conditions by scanning the control track.

17. An information reproducing apparatus according to claim 9, wherein said reproducing means and said reading means comprise a common head.

18. An information recording apparatus comprising:
recording means for recording information on a recording medium;
determining means comprising means for measuring various characteristics of the recording medium, which affect recording conditions of the recording of the information on the recording medium and, in accordance with the measured characteristics, for determining a plurality of operation values of said recording means for effectively recording information on the recording medium; and
control means for controlling said recording means such that said recording means records the plurality of operation values determined by said determining means on the recording medium.

19. An information reproducing apparatus according to claim 18, further comprising means for reproducing the information recorded on the recording medium, wherein said determining means further comprises means for causing said recording means to record a reference signal on the recording medium, for causing said reproducing means to reproduce the recorded reference signal and for measuring a characteristic of the recording medium by the reproduced signal.

20. An information reproducing apparatus according to claim 19, wherein said determining means comprises means for determining the operation value of said recording means such that a reproduction signal of the reference signal becomes a predetermined condition.

21. An information reproducing apparatus according to claim 20, wherein said determining means comprises means for determining the operation value of said recording means such that a duty ratio of the reproduction signal approaches 50%.

22. An information reproducing apparatus according to claim 20, wherein said determining means comprises means for changing the operation value of said recording means upon recording of the reference signal when the reproduction signal does not become a predetermined condition and means for again measuring a characteristic of the recording medium.

23. An information reproducing apparatus according to claim 22, wherein said control means comprises means for detecting the operation values and for controlling said determining means for changing another value of said recording means when said control means detects that one of the operation values for said recording means determined by said determining means has reached one of an upper limit and a lower limit within a control range.

24. An information recording apparatus according to claim 18, wherein said recording means comprises light beam generating means for generating a light beam, and said determining means comprises means for determining power of the light beam upon recording.

25. An information recording apparatus according to claim 18, wherein said recording means comprises magnetic field generating means for generating a magnetic field, and said determining means comprises means for generating strength of the magnetic field.

26. An information recording apparatus according to claim 18, wherein said control means comprises means for causing the operation value to be recorded on a control track of the recording medium and wherein the control track comprises an area on which management information for managing information to be recorded on the recording medium is recorded.

27. An information recording apparatus according to claim 18, further comprising reading means for reading out the operation value recorded on the recording medium; and
second control means comprising means for controlling said reading means for reading out the operation value before information is recorded on the recording medium by said recording means and for controlling an operation of said recording means such that an operation condition of the recording means coincides with the operation value.

28. An information recording/reproducing apparatus comprising:
recording means for recording information on a recording medium, wherein said recording means comprises a plurality of elements;
determining means comprising means for measuring a characteristic of the recording medium, which affects recording conditions of the recording of the information on the recording medium and, in accordance with the measured characteristic, for determining a control value data for an element constituting the recording means which should be controlled;

first control means for controlling said recording means such that said recording means records the control value data determined by said determining means on the recording medium;

reproducing means for reproducing the control value data recorded on the recording medium; and second control means comprising means for controlling said reproducing means for reproducing the control value data when information is recorded on the recording medium and for controlling the element of said recording means in accordance with the control value data reproduced by said reproducing means;

wherein said control means comprises deciding means for deciding whether or not the recording medium has been utilized, and when said deciding means decides that the recording medium has not been utilized, said control means permits the control value data to be recorded on the recording medium.

29. An information recording/reproducing apparatus comprising:

reproducing means for reproducing information recorded on a recording medium;

determining means comprising means for measuring various characteristics of the recording medium, which affect reproduction conditions of the reproduction of the information from the recording medium and for determining a plurality of operation values of said reproducing means for effectively reproducing information recorded on the recording medium; and recording means for recording the plurality of operation values determined by said determining means recorded on the recording medium.

30. An information recording/reproducing apparatus according to claim 29, wherein said reproducing means comprises light beam generating means for generating a light beam, and said determining means comprises means for determining power of the light beam upon reproducing.

31. An information recording/reproducing apparatus according to claim 29, wherein said reproducing means comprises analog-to-digital converting means, and said determining means comprises means for determining a threshold value of said analog-to-digital converting means.

32. An information recording/reproducing apparatus according to claim 29, wherein said reproducing means comprises means for amplifying the reproduced signal, and said determining means comprises means for determining a gain of said amplifying means.

33. An information recording/reproducing apparatus according to claim 29, wherein said determining means comprises means for causing said recording means to record a reference signal on the recording medium, for causing said reproducing means to reproduce the recorded reference signal and measuring a characteristic of the recording medium by the reproduced signal.

34. An information recording/reproducing apparatus according to claim 33, wherein said determining means comprises means for determining the operation value of said reproducing means such that a reproduction signal of the reference signal becomes a predetermined condition.

35. An information recording/reproducing apparatus according to claim 34, wherein said determining means comprises means for determining the operation value of said reproducing means such that a duty ratio of the reproduction signal approaches 50%.

36. An information recording/reproducing apparatus according to claims 34, wherein said determining means comprises means for changing an operation value of said reproducing means upon reproduction of the reference signal when the reproduction signal does not become a predetermined condition and means for again measuring a characteristic of the recording medium.

37. An information recording/reproducing apparatus according to claim 36, wherein said determining means comprises means for changing the control value when the operation value reaches one of an upper limit and a lower limit within a control range.

38. An information recording/reproducing apparatus according to claim 29, wherein said recording means comprises means for recording the operation value on a control track of the recording medium, the control track comprising an area on which management information for managing information recorded on the recording medium is recorded.

39. An information recording/reproducing apparatus according to claim 29, further comprising:

reading means for reading out the operation value recorded on the recording medium; and control means for controlling said reading means for reading out the operation value before information recorded on the record medium is reproduced by said reproducing means and for controlling said reproducing means such that an operation condition of said reproducing means coincides with the operation value read out by said reading means.

40. An information recording/reproducing apparatus comprising:

reproducing means for reproducing information recorded on a recording medium, wherein said reproducing means comprises a plurality of elements;

determining means comprising means for measuring a characteristic of the recording medium, which affects reproduction conditions of the reproduction of the information from the recording medium and for determining a control value data for an element constituting said reproducing means which should be controlled corresponding to the measured characteristic;

recording means for recording an operation value determined by said determining means recorded on the recording medium;

reading means for reading out the control value data and the operation value recorded on the recording medium; and control means for controlling said reading means for reading out the control value data when information recorded on the recording medium is reproduced by said reproducing means and for controlling the element of said reproducing means in accordance with the control value data read out by said reading means;

wherein said control means comprises deciding means for deciding whether or not the recording medium has been utilized, and when said deciding means decides that the recording medium has not been utilized, said control means permits the control value data to be recorded by said recording means.

41. A method for recording conditions of information on a recording medium, comprising the steps of:

a) measuring various characteristics of the recording medium, which affect recording conditions for recording of the information on the recording medium;
b) determining a plurality of recording conditions optimal for the recording of the information on the recording medium, on the basis of the various characteristics of the recording medium measured in said measuring step; and
c) recording the plurality of recording conditions determined in said determining step, on a predetermined area of the recording medium.

42. A method according to claim 41, wherein said measuring step comprises the step of recording the information with predetermined recording conditions on the recording medium and subsequently reproducing the recorded information.

43. A method according to claim 42, wherein said measuring step comprises the step of repeating the recording and reproducing of the information with a change in the predetermined recording conditions.

44. A method according to claim 43, wherein said determining step comprises the step of determining recording conditions with which the information was satisfactorily reproduced in the repetition of reproduction in said measuring step, as the optimum recording conditions.

45. A method according to claim 41, wherein one of the plurality of recording conditions includes an intensity of a light beam for recording of the information on the recording medium.

46. A method according to claim 41, wherein one of the plurality of recording conditions includes the strength of magnetic field applied to the recording medium.

47. A method for recording reproduction conditions of information on a recording medium, comprising the steps of:
a) measuring various characteristics of the recording medium, which affect reproduction conditions for reproducing of the information from the recording medium;
b) determining a plurality of reproduction conditions optimal for the reproduction of the information from the recording medium, on the basis of the various characteristics of the recording medium measured in said measuring step; and
c) recording the plurality of reproduction conditions determined in said determining step, on a predetermined area of the recording medium.

48. A method according to claim 47, wherein said measuring step comprises the step of reproducing a predetermined information recorded on the recording medium with predetermined reproduction conditions.

49. A method according to claim 48, wherein said measuring step comprises the step of repeating the reproduction of the predetermined information with a change in the predetermined reproduction conditions.

50. A method according to claim 49, wherein said determining step comprises the step of determining the reproduction conditions with which the information was satisfactorily reproduced in the repetition of reproduction in said measuring step, as the optimum reproduction conditions.

51. A method according to claim 47, wherein one of the plurality of reproduction conditions includes an intensity of a light beam for reproduction of the information from the recording medium.

* * * * *

UNITED STATES PATENT AND TRADEMARK OFFICE
CERTIFICATE OF CORRECTION

PATENT NO. : 5,410,527
DATED : April 25, 1995
INVENTOR(S) : TAKAAKI ASHINUMA

It is certified that error appears in the above-indentified patent and that said Letters Patent is hereby corrected as shown below:

<u>COLUMN 1</u>

Line 41, "force" should read --force,--.

<u>COLUMN 3</u>

Line 22, "preformated" should read --preformatted--.

<u>COLUMN 12</u>

Line 4, "claims 34," should read --claim 34,--.

Signed and Sealed this

Eighteenth Day of July, 1995

Attest:

BRUCE LEHMAN

Attesting Officer     Commissioner of Patents and Trademarks